Patented Dec. 2, 1947

2,431,745

UNITED STATES PATENT OFFICE 2,431,745

COATING FABRICS

George W. Flanagan, Cleveland, Ohio, assignor to The B. F. Goodrich Company, New York, N. Y., a corporation of New York No Drawing. Application April 5, 1945,
Serial No. 586,821

4 Claims. (Cl. 117—161)

This invention relates to the treatment of textile fabrics, and pertains more specifically to a method of coating textile fabrics with vinyl resins.

I have discovered that fabrics may be provided with a coating which is extremely impervious to water, and is at the same time highly adherent to the fabric base as well as being highly abrasion resistant and capable of retaining its flexibility at low temperatures by coating the fabric first with vinyl resin latex, then with a solution of vinyl resin in a volatile solvent. The process is carried out by coating the fabric first with an aqueous suspension or latex of vinyl resin, drying it, and then applying a second coat of a solution of a vinyl resin in a volatile solvent and allowing the solvent to evaporate.

The vinyl resin latices which may be employed in the process of my invention comprise those having as a base a resin prepared by the polymerization of a monomeric material comprising a chloroethylene having from one to two chlorine atoms on one only of the carbon atoms. The latices may be prepared by dispersing the solid, finely-divided polymer in water, or by polymerizing the monomeric material in aqueous emulsion. More specifically, the latices may be prepared by polymerizing in aqueous emulsion vinyl chloride, vinylidene chloride, mixtures of these two materials with each other, or mixtures of one or both of these materials with other monomers copolymerizable therewith in aqueous emulsion, such as vinyl acetate, vinyl propionate, vinyl butyrate, methyl acrylate, methyl methacrylate, ethyl methacrylate, methyl ethacrylate, maleic acid or anhydride, esters of maleic acid or of chloromaleic acid, and other similar materials. Particularly preferred are the latices prepared by polymerization in aqueous emulsion of vinyl chloride, vinylidene chloride, mixtures of these two materials with each other, or mixtures of one or both of these materials with a lesser proportion of an alkyl ester of an alpha-methylene aliphatic monocarboxylic acid, that is with alkyl esters of acrylic or methacrylic acids or the like. While it is preferred to use the well-known volatile esters of the lower alcohols, such as methyl acrylate, ethyl acrylate, methyl methacrylate, and the like, other esters of acrylic acids, such as butyl acrylate, dodecyl acrylate, phenyl acrylate, ethylene diacrylate, and the like, may also be used. A preferred class of resins consists of those made from monomeric materials in which the chloroethylene is the predominant constituent, i. e., amounts to more than 50% by weight of the material.

Although the vinyl resin latex so prepared may be used without the addition of any other materials, it is preferred that it be plasticized before using. The plasticizers which may be used with this class of resin are well-known to the art, and include, among others, tricresyl phosphate, dibutyl phthalate, dioctyl phthalate, butyl phthalyl butyl glycollate, dioctyl sebacate, ethylene glycol dioleate, undecyl tetrahydronaphthyl ketone, and octyl o-benzoyl-benzoate. The plasticizer may be added to the latex either before, during, or after the polymerization reaction. It may be added in the form of an aqueous emulsion or as a pure liquid. Best results have been obtained by stirring the liquid plasticizer directly into the latex after completion of the polymerization reaction while maintaining the temperature of the mixture above 50° C., preferably between 85 and 100° C. In the higher temperature range, it usually is desirable to employ a closed vessel for the process. In following this process, it has been found that the plasticizer is practically completely absorbed by the resin particles after only a short period of time, about one to four hours depending upon the amount of plasticizer used. If this method of plasticization is employed, it is preferred to use the ester type plasticizers since they diffuse through the aqueous medium more readily, and hence are absorbed by the resin particles more quickly than are other types of plasticizers such as ketones or ethers. The amount of plasticizer employed may vary over a wide range, depending upon the particular resin employed, as well as upon the properties desired in the finished coating; from about 5 to 300 parts by weight of plasticizer for each 100 parts by weight of resin usually produce satisfactory results.

The vinyl resin employed for the second coating in the form of a solution in a volatile solvent may be identical with that used in the form of the latex, or it may be a different resin selected from the same class. For best results, it is preferred to employ for the second coating a polymer made by the polymerization of a monomeric material consisting substantially of vinyl chloride, particularly gamma-polyvinyl chloride. The volatile solvents which may be employed to prepare solutions of the resins are well known to those skilled in the art. By "volatile" is meant those solvents boiling below about 170° C. Among suitable solvents are acetone, methyl ethyl ketone, mesityl oxide, chlorobenzene, chlorotoluene, chloroacetone, ethylene dichloride, cyclohexanone, and cyclopentanone. The vinyl resins used to form the second coating may be plasticized with the same class of materials as was described above for use with the vinyl resin of the first coating. The plasticizers used in the two coatings need not be identical, however.

The textile fabrics to be treated in accordance with this invention may be in the form of woven or knitted fabric containing yarns, filaments, straws, or bristles. The fabric may consist wholly of yarns of natural fibers such as silk, cotton, flax, hemp, wool, or the like, or it may be a mixed fabric containing yarns of such fibers and filaments or yarns of a synthetic nature, such as those made of regenerated cellulose, cellulose esters, such as cellulose acetate, cellulose formate, or the like, cellulose ethers such as ethyl cellulose or benzyl cellulose, superpolyamides, glass, and other synthetic fiber-forming materials. Fabrics made wholly of such synthetic fibers may also be used. Maximum adhesion is obtained by employing unsized fabric or fabric from which the sizing has been removed.

The first or latex coating may be applied to the fabric surface by any of the conventional methods, that is by spraying, brushing, dipping, spreading, or the like. The solid content of the latex employed may be varied over a wide range and is not critical. However, in practice best results are obtained with a latex having from 30 to 65% total solids. The term "total solids" when used in this connection includes the plasticizers, when present, as well as the resin itself, inasmuch as these two materials are intimately bound together and appear in the form of a solid upon removal of the aqueous medium. The latex after application to the fabric as described above, may be dried either at room temperature or at higher temperatures up to about 100° C. For best results, the coating should be heated to about 50 to 75° C. during the drying process, followed by heating for a short time at a higher temperature, about 100° to 250° C., to cause the particles of resin deposited from the latex to fuse together to form a coherent integument. It is preferred to employ a method of heating which primarily affects the latex layer without much heating of the fabric, e. g., infra-red radiation or a current of hot air.

The second or solution coating may be applied as soon as the first coating is dry, using any of the same methods. The second coating may be dried either at room temperature or at an elevated temperature, although it is unnecessary to heat it to as high a temperature as the latex coating in order to obtain a coherent film. Temperatures below 150° C. usually suffice to remove the solvent.

The following specific example will serve more fully to illustrate the nature of my invention. A vinyl resin latex containing about 50% by weight of total solids was prepared by polymerizing in aqueous emulsion a mixture of 80 parts by weight of vinyl chloride and 20 parts by weight of methyl acrylate. After completion of the polymerization reaction, the latex was heated to about 85° C. and there was added to it with constant stirring about 50 parts by weight of dioctyl phthalate for each 100 parts of resin. After about two hours the plasticizer had been completely absorbed by the resin particles and the latex after cooling to room temperature was ready for use. A square woven cotton fabric having 48 ends per inch, suitable for use in raincoats, was then coated with the latex by spreading, and the coating was dried at 80° C. and fused at 150° C. A solution containing about 8% by weight of high-molecular weight polyvinyl chloride (gamma-polyvinyl chloride) and dioctyl phthalate in methyl ethyl ketone, the proportion of polymer to plasticizer being 10 to 6 by weight, was then applied to the coated surface on a spreading machine and dried at about 65° C. The weight of the coating deposited from latex was about 1 oz. per sq. yd., while the weight of that deposited from solution was about 3 oz. per sq. yd. There was obtained a product having a glossy, transparent finish which was highly impervious to water, showing substantially no water absorption after immersion for two weeks at room temperature. The adhesion of the coating to the fabric, as measured on a Cooey testing machine was between 12 and 13 lbs. per inch, whereas the same fabric coated with the same solution of polyvinyl chloride without the use of a latex coating resulted in a product in which the adhesion of the coating to the fabric was only four pounds per inch. Similar results may be obtained with other vinyl resins within the scope of the invention and with other fabrics. For example, a latex of plasticized gamma-polyvinyl chloride may be used for the first coat, followed by using a solution of the same plasticized resin in a volatile solvent for the second coating.

Although I have described a method for producing a colorless, transparent and glossy finish, the properties of the coating may be modified by the addition to the vinyl resin latex or to the solution of the vinyl resin of various other materials, such as pigments, fillers, dyes, other resins, and the like.

Although I have herein disclosed specific embodiments of my invention, I do not intend to limit myself solely thereto, but to include all of the obvious variations and modifications falling within the spirit and scope of the appended claims.

I claim:

1. In the process of coating a textile fabric with plasticized vinyl resin, said vinyl resin being a polymer of a monomeric material comprising a chloroethylene containing from one to two chlorine atoms on one only of the carbon atoms, the improvement which consists in applying the vinyl resin coating to the fabric in two stages, the first stage consisting of coating the fabric with an aqueous dispersion of said resin in which the dispersed phase consists of the plasticized vinyl resin, removing the water from the coating, and heating said coating at 100 to 250° C. until it forms a coherent integument, and the second stage consisting in coating the fabric bearing the coating applied in the first stage with a solution of the said vinyl resin in a volatile solvent, and then removing the solvent, whereby to obtain a coated fabric characterized in that the coating is tightly adhered to the fabric, is highly impervious to water, and is highly resistant to abrasion, said coating being superior, because of these properties, to coated fabrics produced by applying the coating by either the first stage or the second stage alone.

2. The improved process of claim 1 wherein the vinyl resin is a polymer of a monomeric material comprised predominantly of vinyl chloride.

3. In the process of coating a textile fabric with plasticized vinyl resin, the improvement which consists in applying the vinyl resin coating to the fabric in two stages, the first stage consisting in coating the fabric with an aqueous dispersion of a vinyl resin in which the dispersed phase consists of a plasticized copolymer of vinyl chloride and methyl acrylate, removing the water from the coating, and heating said coating at 100 to 250° C. until it forms a coherent integument, and the second stage consisting in coating the fabric bearing the coating applied in the first stage with a solution of gamma-polyvinyl chloride in a volatile solvent and then removing the solvent, whereby to obtain a coated fabric characterized in that the coating is tightly adhered to the fabric, is highly impervious to water, and is highly resistant to abrasion, said coating being superior, because of these properties, to coated fabrics produced by applying the coating by either the first stage or the second stage alone.

4. In the process of coating a textile fabric with plasticized vinyl resin, the improvement which consists in applying the vinyl resin coating to the fabric in two stages, the first stage consisting in coating the fabric with an aqueous dispersion of a vinyl resin in which the dispersed phase consists of plasticized gamma-polyvinyl chloride, removing the water from the coating, and heating said coating at 100 to 250° C. until it forms a coherent integument, and the second stage consisting in coating the fabric bearing the coating applied in the first stage with a solution of plasticized gamma-polyvinyl chloride in a volatile solvent and then removing the solvent, whereby to obtain a coated fabric characterized in that the coating is tightly adhered to the fabric, is highly impervious to water, and is highly resistant to abrasion, said coating being superior, because of these properties, to coated fabrics produced by applying the coating by either the first stage or the second stage alone.

GEORGE W. FLANAGAN.

REFERENCES CITED

The following references are of record in the file of this patent:

UNITED STATES PATENTS

| Number | Name | Date |
| --- | --- | --- |
| 1,967,863 | Collins | July 24, 1934 |
| 2,204,520 | Walker | June 11, 1940 |
| 2,247,064 | Nowak | June 24, 1941 |
| 2,340,298 | Billings | Feb. 1, 1944 |
| 2,354,574 | Carson | July 25, 1944 |
| 2,373,347 | Schoenfeld | Apr. 10, 1945 |